United States Patent
Mou

(10) Patent No.: US 10,695,730 B2
(45) Date of Patent: Jun. 30, 2020

(54) MAGNETIC COUPLING ASSEMBLY FOR COUPLING STIR BAR IN MAGNETIC STIRRER MIXER AND MAGNETIC STIRRER MIXER USING THE SAME

(71) Applicant: Duen-Gang Mou, Taipei (TW)

(72) Inventor: Duen-Gang Mou, Taipei (TW)

( * ) Notice: Subject to any disclaimer, the term of this patent is extended or adjusted under 35 U.S.C. 154(b) by 445 days.

(21) Appl. No.: 15/815,725

(22) Filed: Nov. 17, 2017

(65) Prior Publication Data

US 2018/0141011 A1    May 24, 2018

(30) Foreign Application Priority Data

Nov. 21, 2016 (TW) .............................. 105138050 A

(51) Int. Cl.
*B01F 13/08* (2006.01)
*H02K 49/10* (2006.01)
*B01F 7/00* (2006.01)

(52) U.S. Cl.
CPC ...... *B01F 13/0845* (2013.01); *B01F 7/00033* (2013.01); *B01F 7/00816* (2013.01); *B01F 13/0818* (2013.01); *B01F 13/0836* (2013.01); *H02K 49/108* (2013.01)

(58) Field of Classification Search
CPC .............. B01F 13/0827; B01F 13/0818; B01F 13/0845; B01F 13/0854; B01F 13/08
See application file for complete search history.

(56) References Cited

U.S. PATENT DOCUMENTS

| | | | | |
|---|---|---|---|---|
| 2,350,534 | A | | 6/1944 | Rosinger |
| 3,570,819 | A | | 3/1971 | Rosinger |
| 3,764,836 | A | * | 10/1973 | Bender ............... B01F 13/0827 310/98 |
| 4,477,192 | A | * | 10/1984 | Bonney ............... B01F 13/0818 356/39 |
| 4,797,005 | A | * | 1/1989 | Landsberger ....... B01F 13/0818 366/273 |
| 5,586,823 | A | | 12/1996 | Carr |
| 5,961,213 | A | * | 10/1999 | Tsuyuki ............... B01F 13/0827 366/273 |

(Continued)

FOREIGN PATENT DOCUMENTS

| | | |
|---|---|---|
| CN | 2065098 U | 11/1990 |
| CN | 201089112 Y | 7/2008 |

(Continued)

OTHER PUBLICATIONS

English Translation of JP 2008068229 A of Tomoki (Year: 2008).*

(Continued)

*Primary Examiner* — Jason L Vaughan
(74) *Attorney, Agent, or Firm* — Pai Patent & Trademark Law Firm; Chao-Chang David Pai

(57) ABSTRACT

A magnetic coupling assembly for a magnetic stirrer includes a non-magnetic disc embedded with two or more pairs of magnets. The two magnets of each pair are oriented with opposite magnetic poles pointing in the upward direction. When the magnetic coupling assembly is driven to rotate, it can bind one or more axially magnetized stir bar in a mixer at a relatively higher speed to achieve better mixing result without causing spin-out or jumping-flea phenomena, compared to when only one pair of magnets is used.

22 Claims, 10 Drawing Sheets

(56) References Cited

U.S. PATENT DOCUMENTS

| | | | | |
|---|---|---|---|---|
| 5,985,535 | A | * 11/1999 | Urabe | B01F 7/166 |
| | | | | 366/273 |
| 6,464,387 | B1 | * 10/2002 | Stogsdill | B01F 13/0818 |
| | | | | 366/273 |
| 6,517,231 | B1 | * 2/2003 | Biardeau | B01F 13/0818 |
| | | | | 366/273 |
| 7,112,904 | B2 | * 9/2006 | Akiyama | C30B 15/30 |
| | | | | 310/103 |
| 2003/0053371 | A1 | * 3/2003 | Schoeb | B01F 13/0836 |
| | | | | 366/273 |
| 2007/0247968 | A1 | * 10/2007 | Cleveland | B01F 13/0818 |
| | | | | 366/273 |
| 2010/0046323 | A1 | 2/2010 | Tien et al. | |
| 2016/0235251 | A1 | * 8/2016 | Carella | A47J 43/0465 |
| 2018/0043321 | A1 | * 2/2018 | Mochizuki | B01F 13/0845 |

FOREIGN PATENT DOCUMENTS

| | | |
|---|---|---|
| CN | 102922149 A | 2/2013 |
| CN | 204485737 U | 7/2015 |
| JP | H11-128731 A | 5/1999 |
| JP | 2001-232172 A | 8/2001 |
| JP | 2007-54817 A | 3/2007 |
| JP | 2008-68229 A | 3/2008 |
| TW | 201500546 A | 1/2015 |
| TW | M498421 U | 4/2015 |

OTHER PUBLICATIONS

Wikipedia's article on "Magnetic Stirrer".
Sigma-Aldrich Labware Notes, vol. 3, No. 1, "Dramatically Improve Mixing Results: Stifling bar design makes the difference".

* cited by examiner

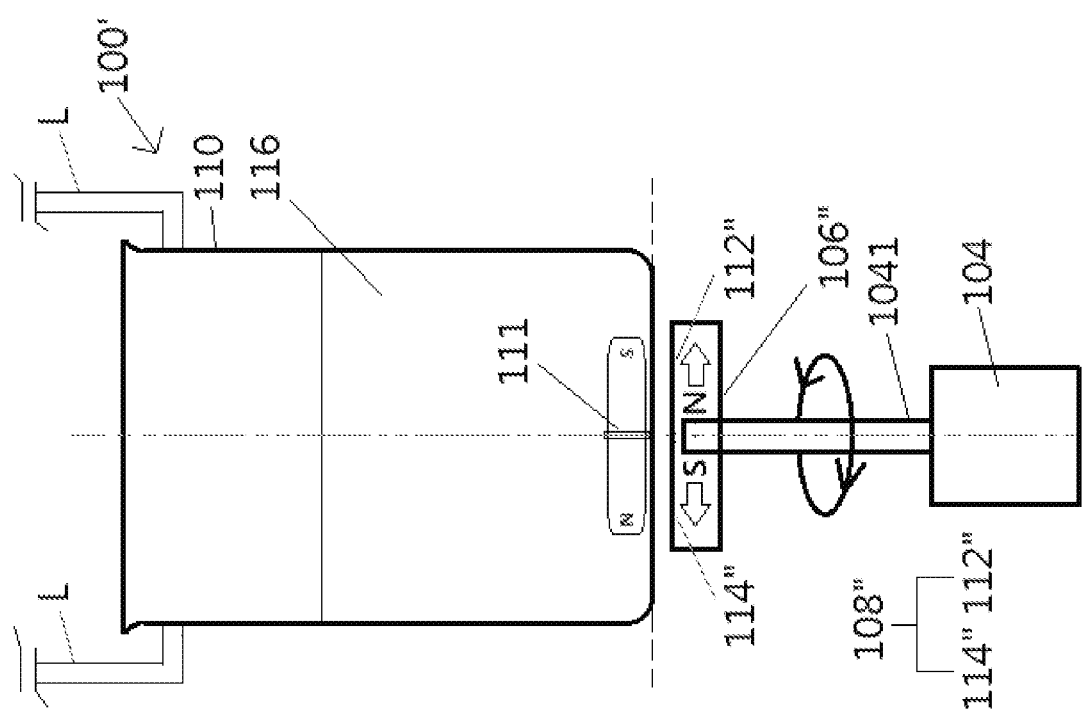

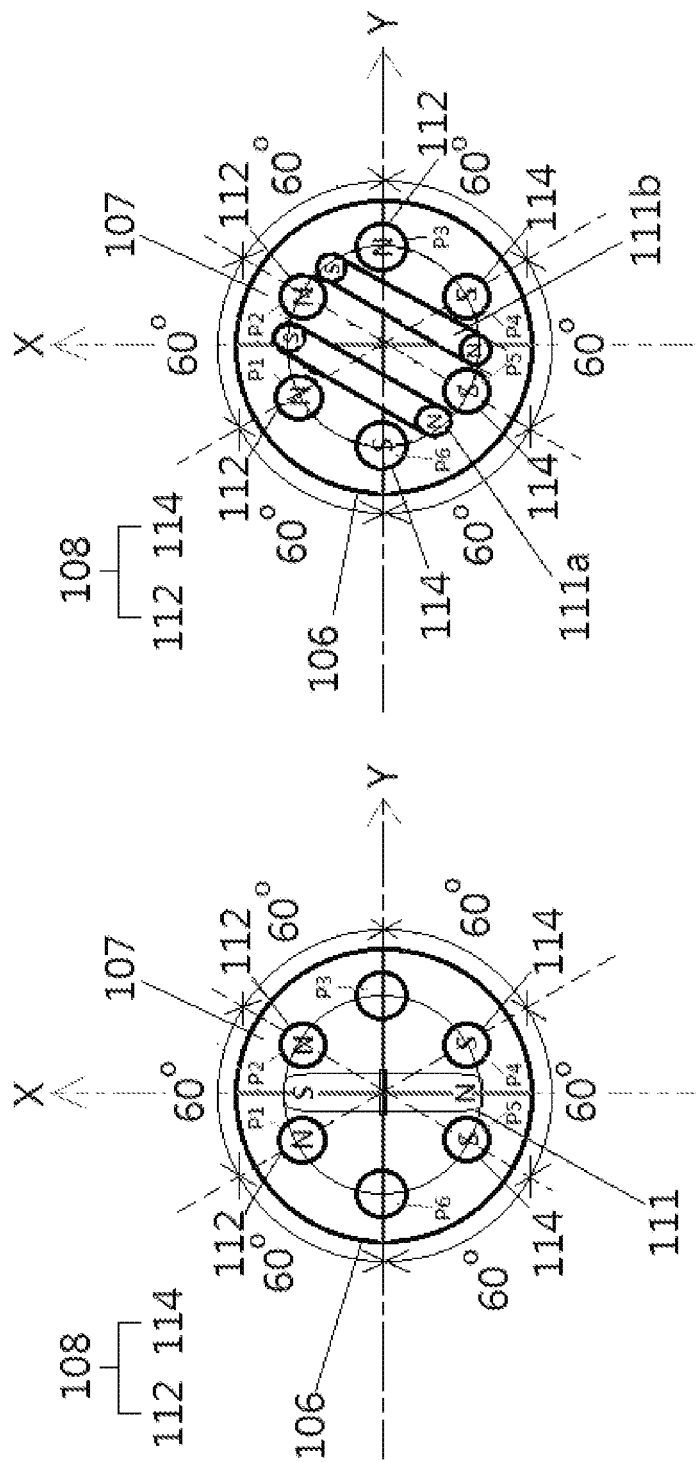

MAGNETIC COUPLING ASSEMBLY FOR COUPLING STIR BAR IN MAGNETIC STIRRER MIXER AND MAGNETIC STIRRER MIXER USING THE SAME

CROSS-REFERENCES TO RELATED APPLICATIONS

This Application claims priority of Taiwan Patent Application No. 105138050 filed on Nov. 21, 2016, the entirety of which is incorporated by reference herein.

BACKGROUND OF THE INVENTION

(a) Field of the Invention

The present invention relates to lab magnetic stirrer mixers in general and to a magnetic coupling assembly for coupling stir bar in a magnetic stirrer mixer in particular. The magnetic coupling assembly is effective in securing the magnetic stirring element, in particular the widely used axially magnetized stir bars, when the mixer is powered on from stand-still to an instant step-up to a high rotational speed and/or when running against high inertia disturbance forces caused by changes of viscosity or fluid flow, and/or gas bubbles, or undesirable vessel geometry or mixing configuration, etc.

(b) Description of the Related Art

Magnetic stirring is used in a number of common laboratory procedures. In chemical, biochemical or biological experiment preparations. FIG. 1A shows a conventional magnetic stirrer mixer (or magnetically coupled stirrer mixer) 100, in which a bipolar stir bar 111 is placed inside a beaker or flask-like mixing vessel 110 and turned by a motor-driven magnetic coupling assembly (MCA) 106' in a magnetic stirrer 102 through magnetism to continuously mix various liquid contents 116 with possibly accompanying powdery solid chemicals, organic materials and/or entrapped gas bubbles. In addition to spare the labor in manual stirring, a magnetic stirrer 102 is utilized to provide a range of steady, continuous and controllable mixing conditions without unplanned interruption.

However, uncoupling of the magnetic stirrer and the spin-out of the stir bar 111 are a common problem today. Careful selection of size, shape or length of the stir bar 111 to match that of the MCA 106' may alleviate the problem to some degree. Proper power of magnetism between the stir bar 111 and the MCA 106' also helps. Due to long existing design flaws of the conventional magnetic stirrer mixer 100, to minimize spin-out with magnetic stirrers, a slow and steady stepping up of rotational speed of the MCA 106' (or the drive magnets in it) is nevertheless required. As noted in SIGMA-ALDRICH Labware Notes, Vol. 3, No. 1, about stirring bar design:

" . . . Once a magnetic stirring bar has been placed in a container with a solution, it should be positioned directly over the center of the drive magnet. The stirring speed should be increased slowly, until the desired vortex pattern is achieved. If magnetic stirring bar lose its coupling with the drive magnet because of the speed of the drive magnet or the viscosity of the fluid, it is said to have "spun-out." Improperly selected stirring bars are the frequent cause of "spin-out", as well as a drive magnet speed that is too fast . . . "

Spin-out or jumping-flea-like stir bar is a result of fluid inertia pushing the stir bar 111 to fall behind the MCA 106' or drive magnets upon motor's starting-up. In one form (not shown), the MCA 106' includes a rod 108' magnetized with a north pole (N-pole) 112' and a south pole (S-pole) 114' at two ends thereof. In another form, as shown in FIGS. 1A and 1B, the rod 108' may be replaced by a magnetic coupling pair 108' of two magnets 112', 114' disposed in the MCA 106', with the N-pole of the magnet 112' pointing upwards and the S-pole of the magnet 114' pointing upwards. The magnetized rod 108' or the magnetic coupling pair 108' of the MCA 106' is turned by a motor 104 and a rotary shaft 1041 to rotate a typical magnetic stir bar 111 through magnetism. The magnetic stirrer 102 has an enclosed space 1021 for this MCA 106', the motor 104, the rotary shaft 1041, and a flat stage 1023 for supporting the mixing vessel 110. When the stir bar 111 is so rotated by a MCA 106' being turned from standstill, its falling behind (e.g., to a position 111' or 111") due to fluid inertia is illustrated in FIG. 1C. This separation of the magnetic coupling poles, if not recovered, e.g. due to excessive starting speed or fluid flow disturbances, the stir bar 111 can instantly lose its magnetic coupling and snake away before it is jettisoned by alternate pulsing N- and S-magnetic fields of the MCA 106' into a quick random and popping motion, or the above mentioned spin-out or jumping-flea phenomena.

High start-up inertia due to a big step-change in the rotational speed of the MCA easily overcomes MCA's coupling force and is the main reason behind stir bar uncoupling in lab magnetic stirrers. This also limits their mixing performance under high speed, hence a typical rated maximum stirrer speed of 1000 to 1200 rpm for basic commercial lab magnetic stirrers without an automated speed ramping program. More advanced magnetic stirrers avoid stir bar spin-out by using an automated program for controlled spontaneous motor speed ramping (up to a user-set rpm) to secure a more synchronous MCA-stir-bar coupling. In electro-magnetized lab magnetic stirrers, this pre-programmed ramping of stirrer speed or auto stir bar start up is even easier albeit their inherent low mixing power or coupling strength. These modern day improvements bypassed the stir bar spin-out problem but left it basically unsolved. An instant step change of a major magnitude such as hundreds to more than 1000 rpm in stirrer speed will produce certain stir bar spin-out or uncoupling.

Instead of a point-to-point coupling between a common stir bar and a bar- or rod-shaped MCA—both magnetized at opposite ends, a disc-shaped MCA magnetized at both halves for a point-to-line or point-to-area coupling of the stir bar has also been used to deal with the inertia-triggered stir bar spin-out. A disc-shaped MCA 106" is shown in FIGS. 2A and 2B. The disc-shaped MCA 106" includes a disc 108" magnetized with an N-type diffused pole 112" and an S-type diffused pole 114" at two halves is turned to rotate a typical magnetic stir bar 111 in a magnetic stirrer mixer 100' mounted on a hanging fixture L. When the stir bar 111 is pushed by the disc-shaped MCA 106" being turned from standstill, its falling behind (e.g., to a position 111' and 111") due to fluid inertia is illustrated in FIG. 2C. Due to the lack of a position-specific or position-defined boundary or a magnetic pull to a moving stir bar, the stir bar has an uninhibited access to many possible coupling positions (FIG. 2B). Therefore, upon a disc-MCA's start-up-inertia-push it can easily roll over the entire MCA coupling field until falling off. Hence, half-and-half bipolar magnetized disc-MCA 106″ does not in practice contain the stir bar 111 and prevent it from snaking, skating or sliding to a helpless spin-out or uncoupling.

An improved MCA and stir bar coupling in a lab magnetic stirrer not prone to spin-out and suitable for continuous high speed and power mixing without undue interruption is therefore desirable.

BRIEF SUMMARY OF THE INVENTION

The magnetic coupling assembly (MCA) according to the present invention, when turned on and off under a high rotation speed setting, can bind an axially magnetized common stir bar without causing the spin-out or jumping-flea phenomena known to common lab magnetic stirrers.

An embodiment of the MCA of the present invention includes two parallel magnetic coupling pairs with two binding N-poles and two binding S-poles, or 2N=2S, their combined magnetic pull on the respective S-pole and N-pole of the stir bar can then restrictively confine or "cage" the stir bar in one and only one defined or "sandwiched" location. The common lab stir bar so coupled by this invention is literally "trapped" and has little chance to wonder about, and may withstand much higher and more dynamic magnetic pull before uncoupling or spin-out can occur.

Another embodiment of the MCA of the present invention includes three parallel magnetic coupling pairs with three binding N-poles and three S-poles, or 3N≡3S, and their combined magnetic pull on the respective S-pole and N-pole can then restrictively confine or "cage" two stir bars instead of one in one and only one set of defined locations. Because of the plurality of magnetic binding cages of the MCA and the tandem stir bars, the power input of the magnetic stirrer is doubled and the stirring process is enhanced. Two stirring elements so coupled can be two independent stir bars or mounted in tandem with a non-magnetic fixture in their plane of rotation. More stir bars may be so coupled by adding more parallel magnetic coupling pair on the MCA of the present invention.

Employing aforementioned coupling principle of 2-pole on MCA to bind one-pole on stir bar, this invention further discloses a MCA design and magnets placement thereof to unify the coupling of either a single or a double stir bars. This design involves an even placement of six identical wells, 60-degree apart on a circle of diameter comparable to the length of the stir bar used, on a disc or slab made of non-magnetic material so that either 4 or 6 magnets may be selected to respectively create two or three parallel magnetic coupling pairs. In the case of a 6 magnets or a 3N≡3S MCA, two stir bars can be put to work by rotating this MCA parallel to the plane of stirring. In the case of 4 magnets or a 2N=2S MCA, two neighboring wells each at opposite end of the circle are used to embed the magnets for a single stir bar coupling. In practice, the MCA slab and magnet wells on it may preferably take a disc and cylindrical shape, respectively, and so are the magnets used. Magnets need to be immobilized in their respective wells using glue or hard enclosures.

Above said N-pole and S-pole magnets or magnets pairs on the MCA are the permanent magnet type. Their magnetic force field is equal or stronger than that of said stir bar or bars they attract. They can also be magnets of the rare earth type, or more specifically the neodymium-iron-boron kind.

Above said stir bars generally take a rod or a capsule shape of various lengths, and are axially magnetized. They include the common and commercially available Teflon coated and rod shaped stir bars. They can also be permanent magnets of the rare earth type, or the neodymium-iron-boron kind.

In the 2N=2S and 3N≡3S MCA embodiments, the axis of rotation goes right through the center of the magnetic binding cage or cages, i.e. through the intersection of the planes of symmetry for all the drive magnets on MCA. This balances the centrifugal force in all directions, hence assures a stable running magnetic stirrer at high rotation speed. For mixing at sufficiently lower speed, this balance may not be necessary, for the "caged" magnetic pull of this invention on the stir bar is strong enough to absorb the unbalanced centrifugal pull. Separate embodiments of this invention use variant MCA-stir-bar coupling to turn the same stir bar off-centered and off-balanced with expanded effective radius of mixing. This has the added advantage of better mixing and higher power drawn in a larger mixing vessel at reduced stirrer speed, because the mixing power drawn in laminar region of ungassed Newtonian fluid is proportional to the square of stirrer rotation speed and cubic of stirrer diameter.

In one variant application, the magnetic coupling pairs is simply shifted sideways along their line of symmetry of the two magnetic coupling pairs on the MCA and, as a result, so is the coupled stir bar. In another variant application, the centered magnetic coupling pairs are kept untouched and their axis of rotation are moved off-center along their line of symmetry on the MCA. With the same stir bar as before, both variant applications produce the same effect of expanded mixing radius or diameter and increased power drawn under reduced stirrer speed.

BRIEF DESCRIPTION OF THE DRAWINGS

FIG. 1A is a vertical sectional view of a magnetic stirrer mixer with conventional point-to-point magnetic (pole) coupling;

FIG. 1B gives two side views of the magnetic coupling between a stir bar and a single magnetic coupling pair along the axial direction of the stir bar;

FIG. 1C is a top view of the magnetic coupling pair, showing a stir bar's falling behind under fluid inertia when the single magnetic coupling pair starts to rotate.

FIGS. 2A-2C illustrate the point-to-area magnetic (pole) coupling used in a conventional magnetic stirrer mixer:

FIG. 2A is a vertical sectional view of a magnetic stirrer mixer with conventional point-to-area magnetic (pole) coupling;

FIG. 2B gives two side views of the magnetic coupling between a stir bar and a diffused half-circle magnetic coupling pair;

FIG. 2C is a top view of the diffused magnetic coupling pair, showing a stir bar's uninhibited access to many coupling positions of equal magnetic potential.

FIG. 3A is a top view of the coupling with four drive magnets or two magnetic coupling pairs of drive magnets, which are embedded in the MCA and respectively positioned at four corners of a rectangle;

FIG. 3B gives the side view of the coupling from the S-pole side of the stir bar along the axial direction of the stir bar;

FIG. 3C gives the side view of the coupling from the N-pole side of the stir bar along the axial direction of the stir bar;

FIG. 3D corresponds to the top view in FIG. 3A, showing that the stir bar is confined or "caged" by the four-corner magnetic coupling.

FIGS. 4A-4D illustrate various arrangements of multiple magnetic coupling pairs of drive magnets embedded in a rotating disc of the MCA according to the present invention:

FIG. 4A is a top view of one arrangement for coupling a single stir bar;

FIG. 4B is a top view of another arrangement for coupling two stir bars;

FIG. 4C, corresponding to FIG. 4B, gives two side views of the coupling of two stir bars by three magnetic coupling pairs, along the axial direction of the stir bars.

FIG. 4D, corresponding to FIG. 4B, shows two stir bars mounted in tandem with a non-magnetic fixture in their plane of rotation, and with secondary mixing impellers attached.

FIG. 5A shows an off-center stirring by shifting the axis of rotation of the MCA;

FIG. 5B shows an off-center stirring by shifting magnetic coupling pairs in the same direction.

Figure 1A:
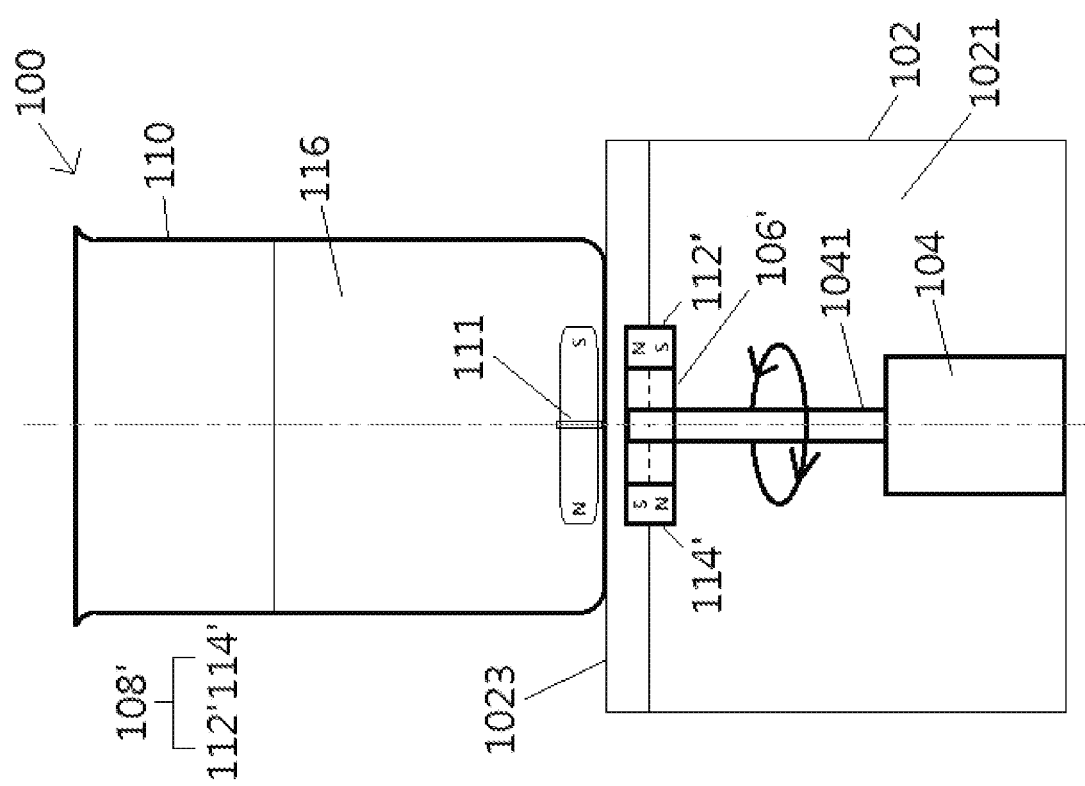
FIGS. 1A-1C illustrate the point-to-point magnetic (pole) coupling used in a conventional magnetic stirrer mixer (or magnetically coupled stirrer mixer)

In order to aid in the understanding of the present invention, the dimensions of the drawings may be exaggerated and not to actual proportions in practice. It is understood that the parts in the drawings and the following description may be replaced by functionally equivalent ones known in the art.

DETAILED DESCRIPTION OF THE INVENTION

The present invention will be described in detail through a number of embodiments in conjunction with the accompanying drawings. Examples will be provided to illustrate the advantages and effectiveness of the present invention.

Figure 1C:
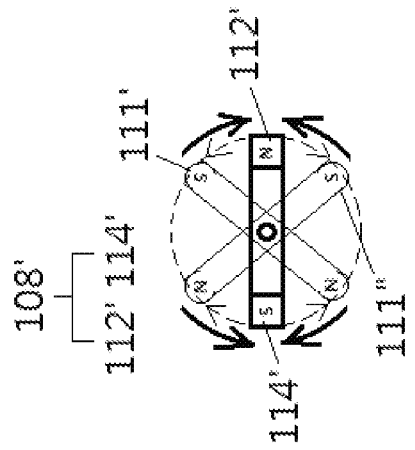
Figure 1B:
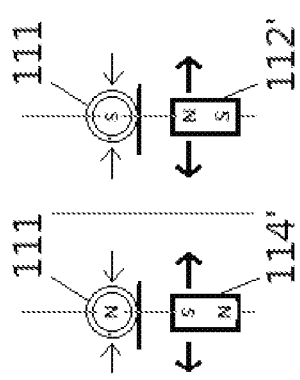
Figure 2C:
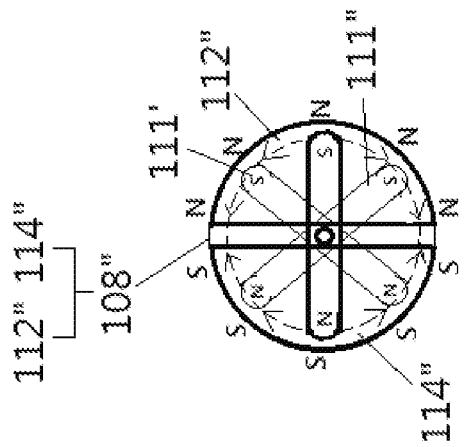
Figure 2B:
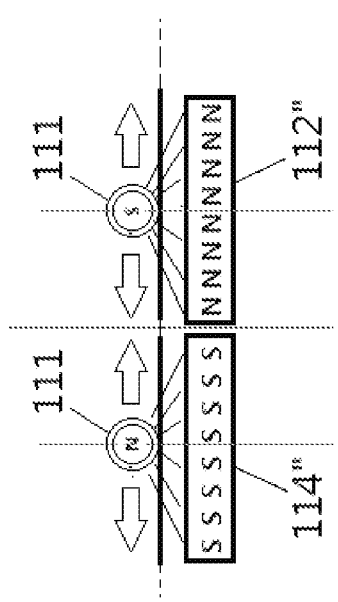
Figure 3B:
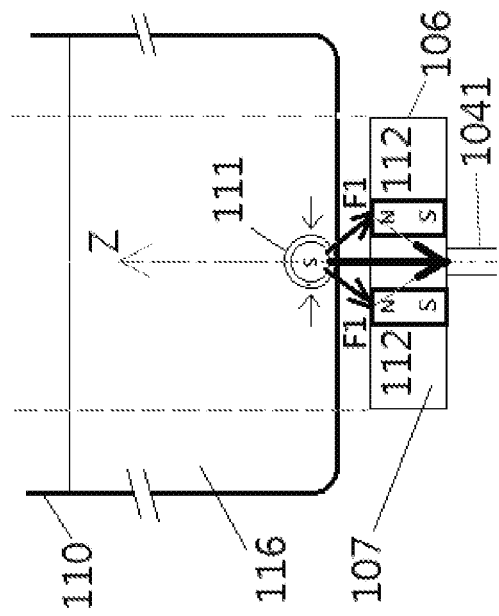
FIGS. 3A-3D illustrate the one-point-to-two-point magnetic pole coupling of a stir bar by the magnetic coupling assembly (MCA) according to the present invention.
Figure 3A:
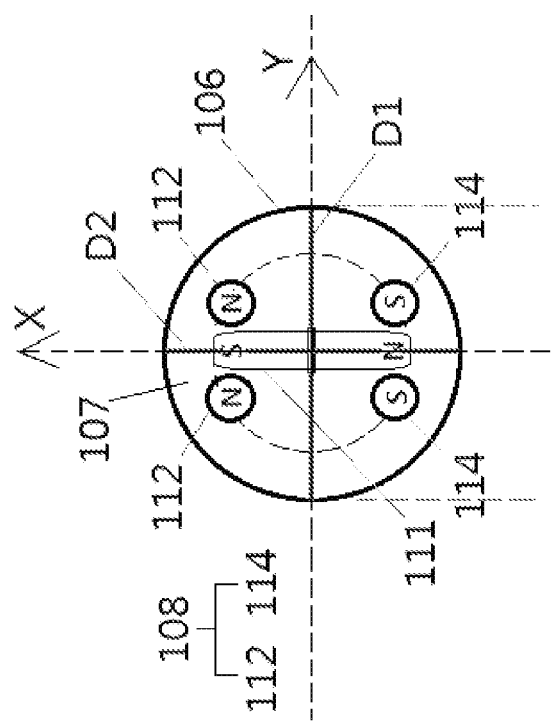
Figure 3D:
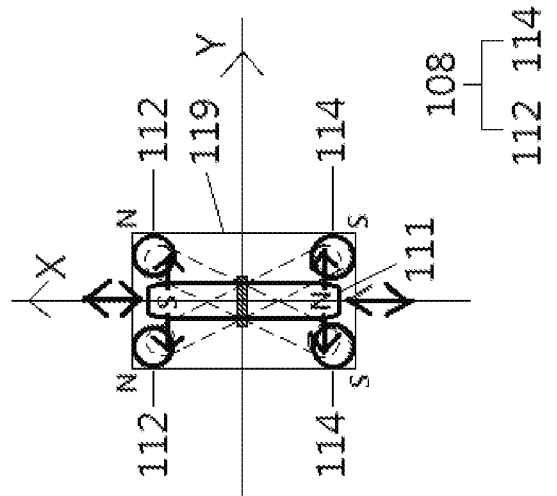
Figure 3C:
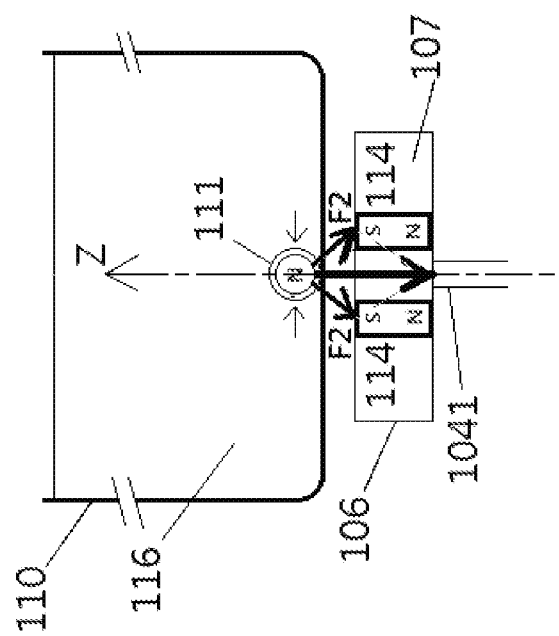

A preferred embodiment of the magnetic coupling assembly (MCA) 106 according to the present invention is shown in FIGS. 3A-3D. The MCA 106 of the present invention has a non-magnetic block 107, preferably in a flat disc shape, for carrying or embedding drive magnets 112, 114. As with a conventional MCA, a drive mechanism (not shown in FIG. 3A) is connected to the non-magnetic block 107 of the MCA 106 for rotating the non-magnetic block 107 and therefore the MCA 106 about an axis of rotation. In FIG. 3B and FIG. 3C, the axis of rotation of the MCA 106 passes through the center of the rotary shaft 1041 and is collinear with the Z-axis. Instead of using conventional single point-to-point magnetic coupling (as shown in FIGS. 1B and 1C) or point-to-area magnetic coupling (as shown in FIGS. 2B and 2C), the MCA 106 uses two magnetic coupling pairs 108 each with two drive magnets 112, 114 embedded in the non-magnetic block 107. The four drive magnets 112, 114 are respectively positioned at four corners of a four-corner cage 119, as illustrated in FIG. 3D. For each of the magnets embedded in the non-magnetic block 107, its magnetic pole pointing upwards so as to bind an opposite magnetic pole of a bipolar stir bar 111 is termed the "binding pole". In each magnetic coupling pair 108, the two magnets 112, 114 have opposite binding poles, namely, one magnet 112 has its N-pole pointing upwards and the other 114 has its S-pole pointing upwards. The magnets 112 and the magnets 114 will be called the N-pole magnets and S-pole magnets in the following. Moreover, the magnets with the same magnetic pole pointing upwards should be positioned at adjacent corners of the four-corner cage 119. When the MCA 106 includes two magnetic coupling pairs (i.e. 2N=2S) on the MCA, as shown in FIGS. 3A-3C, their combined magnetic pull (arrow F1 and F2) by the two N-pole magnets 112 and two S-pole magnets 114 on the S-pole and the N-pole, respectively, of the stir bar 111 can then restrictively confine or "cage" the stir bar 111 in one and only one defined location—which is centered in the corresponding four-corner cage 119 formed by the two magnetic coupling pairs 108 and axially aligned between the two N-pole magnets 112 and between the two S-pole magnets 114 of the two magnetic coupling pairs 108. As shown in FIGS. 3A-3D, when the two magnetic coupling pairs 108 are identical and arranged in parallel in both X- and Y-dimensions, the four-corner cage 119 becomes a rectangle, and there are two mutually perpendicular planes of symmetry D1, D2 for the two magnetic coupling pairs 108. Namely, the plane D1 symmetrically separates the two N-pole magnets 112 from the two S-pole magnets 114, and the plane D2 symmetrically separates the two magnetic coupling pairs 108. It is preferable that the axis of rotation of the MCA 106 be collinear with the intersection of the two planes of symmetry D1, D2. Namely, the axis of rotation passes vertically through a point which is the intersection of the two lines of symmetry of the rectangle 119, as illustrated in FIGS. 3A-3C. It will be shown later that the axis of rotation of the MCA 106 may be moved from this point along the line of symmetry between the two magnetic coupling pairs 108 for expanding the stirring radius of the stir bar 111. Therefore, when the stir bar 111 is confined and coupled by the two magnetic coupling pairs 108, the two planes of symmetry D1, D2 also become the planes of symmetry of the stir bar 111. The stir bar 111 so coupled by the MCA 106 is literally "trapped" and has little chance to wonder about. By figuring in the inertia push upon stirrer start up in designing the new MCA 106, the stir bar 111 must overcome much higher and latent magnetic pull by the dual magnetic coupling of the MCA 106, before uncoupling or spin-out can occur.

Figure 4C:
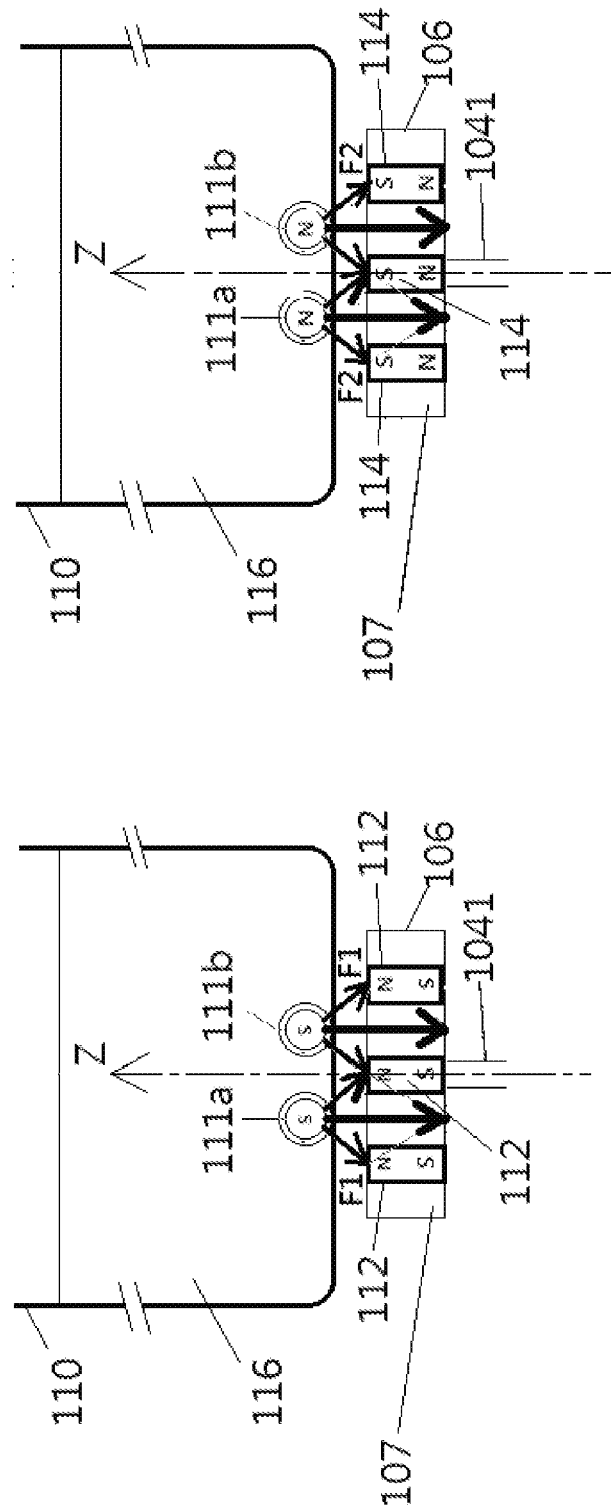

When combining two four-corner cages in FIG. 3A arranged in parallel, a resultant MCA will be able to "trap" two common lab stir bars 111 in parallel. In its simplest, as shown in FIGS. 4A-4D, three identical magnetic coupling pairs 108 are arranged "in parallel", namely the line connecting the two magnets 112, 114 of one magnetic coupling pair 108 is parallel to the line connecting the two magnets 112, 114 of every other magnetic coupling pair 108. In addition, the middle coupling pair is placed such that the two planes of symmetry for the other two coupling pairs are also the planes of symmetry of the middle coupling pair. Such a 3N≡3S MCA 106 can simultaneously couple two identical stir bars 111 using six embedded magnets 112, 114. Note that as shown in FIG. 4B, the two magnets of the middle coupling pair (at P2-P5) and one other coupling pair (at P1-P6 or P3-P4) are respectively positioned at the four corners of a quadrangle, here a trapezoid (i.e. P1-P2-P5-P6 or P2-P3-P4-P5), The two quadrangles represented respectively by P1-P2-P5-P6 or P2-P3-P4-P5, share one side corresponding to the middle coupling pair at P2-P5.

In the particular MCA design shown in FIGS. 4A-4B, six identical wells P1 through P6, 60-degree apart, are formed around a circle of a diameter comparable to the length of the stir bar 111 on the non-magnetic block 107. A selective embodiment of two magnetic coupling pairs 108 with 4 drive magnets (as shown in FIG. 4A) or three magnetic coupling pairs 108 with 6 drive magnets (as shown in FIG. 4B) can respectively create two or three parallel magnetic coupling pairs 108.

In the MCA 106 in FIG. 4A, two N-pole magnets 112 are placed in the wells P1 and P2 and two S-pole magnets 114 in the wells P4 and P5. Their combined magnetic pull can trap the stir bar 111 and prevent uncoupling as described earlier.

Figure 4D:
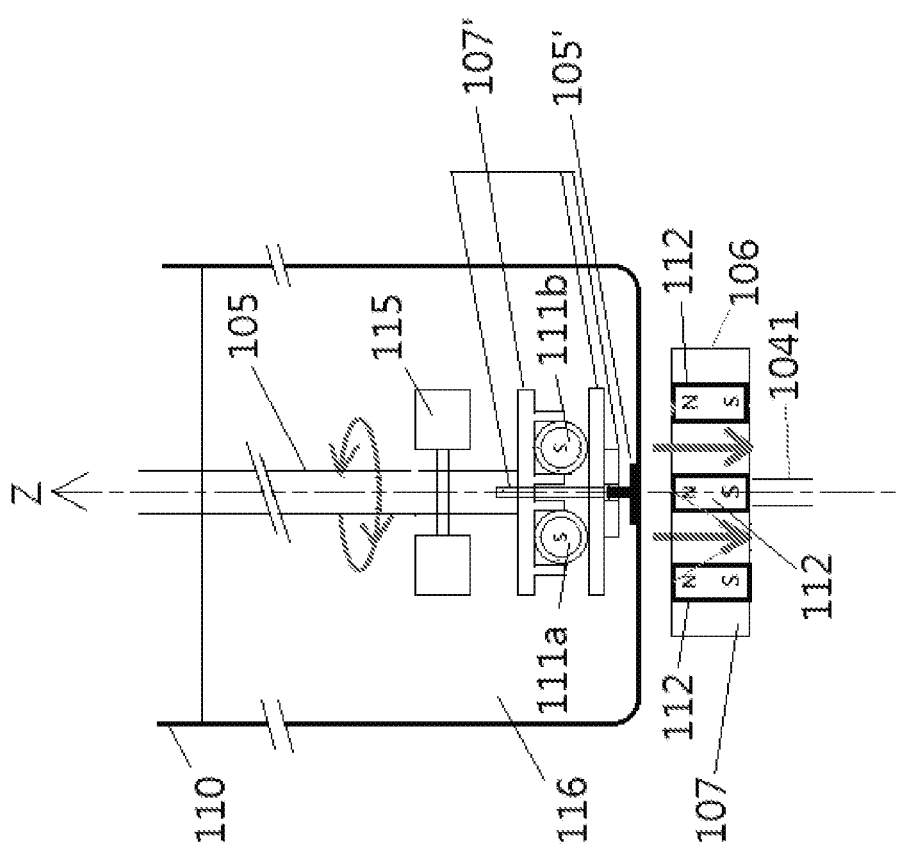

In the MCA 106 shown in FIG. 4B, with 6 drive magnets embedded in the same disc MCA 106, namely three N-pole magnets 112 in the wells P1, P2 and P3 and three S-pole magnets 114 in the wells P4, P5 and P6, the combined magnetic pull (F1 and F2) on the respective S-poles and N-poles of the two stir bars 111a, 111b can then confine or "cage" the two stir bars 111a, 111b, in two respective four-corner trapezoidal cages. Note that the two four-corner trapezoidal cases share the magnetic coupling pair 108 in the middle. Because of the multiple magnetic coupling between the MCA 106 and the tandem stir bars 111a, 111b, one now has a way to double the power input of the magnetic stirrer and, consequently, enhance the stirring process. Two stirring elements so coupled can be two independent stir bars as shown in FIG. 4C, or mounted in tandem as known to people skill in the art with a non-magnetic fixture 107' in their plane of rotation as shown in FIG. 4D. The non-magnetic fixture 107' shown here has three pieces, a top and a bottom pieces to sandwich the stir bars, and a center piece to clamp the other two pieces together and bolt the tandem stir bars to the bottom of the shaft 105. The free turning shaft 105 together with the attached tandem stir bars assembly are centered by magnetism and gravity on the same axis of rotation as the drive magnets 106 by a pivot piece 105' fixed at bottom of the vessel 110 and provide a separate means for adding a secondary stirring or mixing elements such as impellers 115. To be effective, distance between the stir bars 111a, 111b and the drive magnets 106 must be kept to a minimum. The other end of shaft 105 can be cut short at the impeller 115 position for low speed stirring, and anchored to vessel top by ball bearings at high speed stirring. More stir bars can be so coupled by adding additional parallel magnetic coupling pairs 108 in an MCA.

Figure 5B:
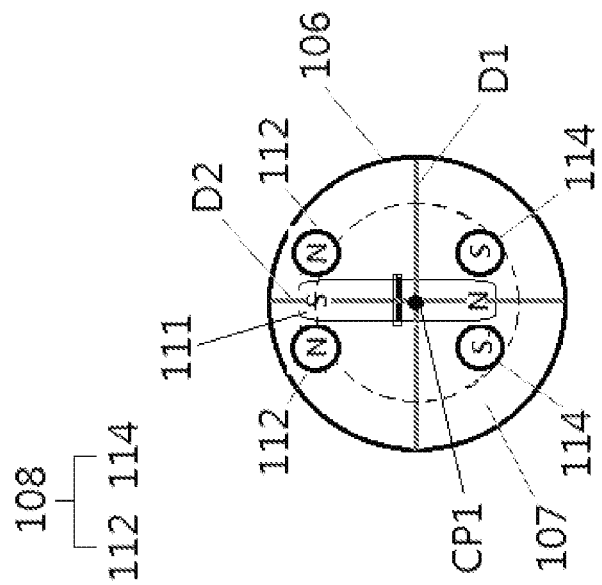
FIGS. 5A-5B illustrate means for an off-center stirring for achieving expanded stir bar mixing radius.
Figure 5A:
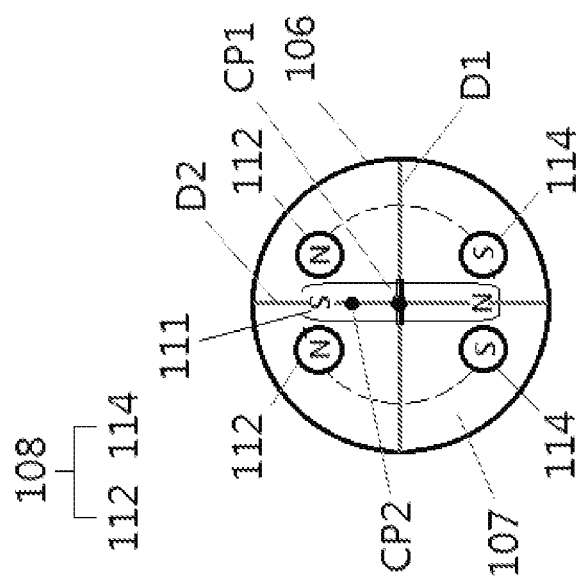

Further enhancement of the stirring process using lab stir bars according to the present invention involves expanding the stirring radius of the stir bar, hence, increasing the mixing power drawn. As shown in FIG. 5A, by moving the axis of rotation of the MCA 106 along the plane of symmetry D2 (i.e. along the line of symmetry between the two magnetic coupling pairs 108) to a point CP2 from the center CP1 of the two magnetic coupling pairs 108 (i.e. the intersection of the planes of symmetry D1 and D2 for the two magnetic coupling pairs 108), the effective stirring diameter of the stir bar 111 increases by twice the distance between CP1 and CP2. Due to the increase in the stir bar's centrifugal force, the increase in the power drawn is naturally at the expense of the stirring speed. The similar effect can be accomplished by shifting the two magnetic coupling pairs 108 sideways from the axis of rotation of the MCA 106 along the plane of symmetry D2, as illustrated in FIG. 5B.

Compared to the conventional simple one-dimensional or line coupling, the magnetic coupling assembly according to the present invention gives a true three-dimensional magnetic coupling—an improved dynamic "cage" coupling to trap common lab stir bars and enable a magnetic stirrer mixer to have (1) an instant step up of hundreds to a thousand rpm stirrer speed, and (2) a continuous high speed stirring up to 3000 rpm without stir bar uncoupling, plus (3) a higher mixing power drawn by coupling to two or more stir bars.

Several embodiments of the MCA according to the present invention were experimented to show their advantaged and effectiveness. The experiments and the results are provided in the following Examples.

Example 1

By referring to FIG. 3D, a rectangular plastic block 25 by 48 mm is used to embed four small neodymium-iron-boron disc type drive magnets of 5 mm diameter and 5 mm thickness with a relatively small size of 14 mm by 25 mm for the four-corner cage. If only a diagonal pair of drive magnets is embedded, the conventional coupling shown in FIGS. 1A-1C is obtained. Three kinds of Teflon-coated stir bars of 8 mm diameter and of various lengths L and shapes: (A) L=38 mm, octagonal cross section with a central integrated pivot ring (like the stir bar 111 shown in FIG. 1A); (B) L=27 mm, smooth cylindrical shape; and (C) L=44 mm; smooth elliptical shape were tested for effectiveness of magnetic coupling by this invention versus the conventional magnetic coupling. The effectiveness of magnetic coupling is expressed as maximum stirrer speed attainable and minimum spin-out speed upon instant step-up from standstill. The coupling space between the two was about 5-6 mm, which includes the combined thickness of the glass beaker bottom and the platform 1023 and the air space in between. The stir bar was placed in the bottom center of a 600 mL glass beaker with 330 mL tap water at a room temperature of 22° C. A 5,000 rpm brushless DC motor with digital tachometer rpm readout to ±1 rpm was used to drive the MCA and the magnetically coupled stir bar at various speeds set by hand with a simple about half-turn rheostat. The test results are listed below:

TABLE 1

| | Magnetic coupling assemblies | | | |
| --- | --- | --- | --- | --- |
| | Single coupling pair, 17-27 mm reach* | | Dual coupling pairs of this invention, 15-25 mm reach* | |
| Measurement | Max. stirrer speed (rpm) | Min. spin-out speed (rpm) | Max. stirrer speed (rpm) | Min. spin-out speed (rpm) |
| Stir bar A, 38 mm long | 400 | Too low to measure reliably | 1,800 | 900 |
| Stir bar B, 27 mm long | 1,000 | 800 | 1,600 | 1,100 |
| Stir bar C, 44 mm long | 200 | Too low to measure reliably | 200 | Too low to measure reliably |

*The magnetism's "mm reach" by the magnetic coupling pair on the stir bar is represented by two figures, which are defined here respectively as the distance (parallel to the stirring plane) between the closest edges and the distance between the farthest edge of the two magnets (112 and 114) in one coupling pair 108. The first figures mean that the two magnets are 17 and 15 mm apart, respectively. The second figures of 27 and 25 mm are then respectively obtained by adding the diameters of the two magnets, 5 × 2 = 10 mm, to the first figures, (same for EXAMPLES 2 and 3).

Example 2

In reference to FIG. 3D, the same rectangular plastic block as in Example 1 is used in this Example whereas embedded therein are four medium size neodymium-iron-boron disc type drive magnets 108 of 8 mm diameter and 5 mm thickness with a relatively larger cage size of 20 mm by 43 mm. The rest of the MCA design and tests are the same as Example 1. The test results are listed below:

TABLE 2

| | Magnetic coupling assemblies | | | |
|---|---|---|---|---|
| | Single coupling pair 29-45 mm reach* | | Dual coupling pairs of this invention, 27-43 mm reach* | |
| Measurement | Max. stirrer speed (rpm) | Min. spin-out speed (rpm) | Max. stirrer speed (rpm) | Min. spin-out speed (rpm) |
| Stir bar A, 38 mm long | 400 | Too low to measure reliably | 2,900 | 1,400 |
| Stir bar B, 27 mm long | <200 | Too low to measure reliably | 1,200 | 1,100 |
| Stir bar C, 44 mm long | 1,900 | 900 | 2,000 | 1,000 |

*See note under Table 1.

Example 3

In reference to FIG. 4A, a drive magnet disc 106 of 48 mm diameter and embedded with four neodymium-iron-boron type disc magnets of 10 mm diameter and 12 mm thickness with a cage size of 25 mm by 36 mm. If only the diagonal pair of magnets, e.g., P1 and P4, is embedded as in Example 1, the conventional coupling of FIG. 1 is obtained. Due to the design differences, the coupling space between the magnets and the stir bar in this example is about 7-8 mm, which includes the combined thickness of the glass beaker bottom plus the platform 1023 and the air space in between. A 3100 rpm brushless DC motor with digital tachometer rpm readout to ±1 rpm, a 10-turn precision rheostat and an on-off instant motor-breaking toggle switch was used. The rest of the MCA design and tests are the same as in Example 1. The test results are listed below:

TABLE 3

| | Magnetic coupling assemblies | | | |
|---|---|---|---|---|
| | Single coupling pair 20-40 mm reach* | | Dual coupling pairs of this invention, 16-36 mm reach* | |
| Measurement | Max. stirrer speed (rpm) | Min. spin-out speed (rpm) | Max. stirrer speed (rpm) | Min. spin-out speed (rpm) |
| Stir bar A, 38 mm long | >3,100 | 1,200 | >3,100 | 1,700 |
| Stir bar B, 27 mm long | 2,800 | 1,600 | 3,000 | 1,800 |
| Stir bar C, 44 mm long | 2,400 | 900 | >3,100 | 1,200 |

*See note under Table 1.

The examples above show not only the known practice of proper stir bar length selection for effective magnetic coupling, but also the significant quantitative improvement of the "caged" or "sandwiched" coupling according to the present invention in terms of enabling both higher stirrer start up speed (or instant rpm step-up) and maximum attainable stirrer speed, without stir bar spin-out. The scale of improvement is even more significant with smaller magnets or at lower magnetic coupling potential.

I claim:

1. A magnetic stirrer for a magnetic stirrer mixer, the magnetic stirrer comprising:
   a magnetic coupling assembly comprising:
      a non-magnetic block; and
      a first coupling pair of magnets and a second coupling pair of magnets mounted in a top side of the non-magnetic block, wherein
         the two magnets of each of the two coupling pairs are oriented such that one has its north pole (N-pole) pointing upwards and the other has its south pole (S-pole) pointing upwards;
         the four magnets of the two coupling pairs of magnets are respectively positioned at four corners of an imaginary first quadrangle on the top side of the non-magnetic block; and
         the two magnets having their respective N-poles pointing upwards are positioned at two adjacent corners of the first quadrangle; and
      a drive mechanism connected to the non-magnetic block for rotating the non-magnetic block and therefore the magnetic coupling assembly about an axis of rotation.

2. The magnetic stirrer of claim 1, wherein the first quadrangle is a first rectangle.

3. The magnetic stirrer of claim 2, wherein the first rectangle has two sides longer than the other two sides and the magnets of each coupling pair are positioned at the two corners joined by one of the longer sides.

4. The magnetic stirrer of claim 2, wherein the axis of rotation of the magnetic coupling assembly vertically passes through a point on a line of symmetry of the first rectangle running between the two coupling pairs.

5. The magnetic stirrer of claim 4, wherein the axis of the rotation of the magnetic coupling assembly passes through the center of the rectangle.

6. The magnetic stirrer of claim 1, wherein the non-magnetic block of the magnetic coupling assembly is of a circular disc shape.

7. The magnetic stirrer of claim 1, wherein each of the magnets is embedded in a respective well formed in the non-magnetic block.

8. The magnetic stirrer of claim 1, wherein the magnets are of a same shape, size and magnetic field potential.

9. The magnetic stirrer of claim 1, wherein the magnets are permanent magnets.

10. The magnetic stirrer of claim 1, wherein the magnets are rare-earth magnets.

11. The magnetic stirrer of claim 1 wherein the magnets are neodymium-iron-boron magnets.

12. The magnetic stirrer of claim 1, wherein the drive mechanism comprises an electric motor and a rotary shaft, to which the non-magnetic block is mounted.

13. The magnetic stirrer of claim 1, further comprising a third coupling pair of magnets mounted in the top side of the non-magnetic block, wherein
   the two magnets of the third coupling pair are oriented such that one has its north pole (N-pole) pointing upwards and the other has its south pole (S-pole) pointing upwards;
   the two magnets of the third coupling pair and the two magnets of the second coupling pair are respectively positioned at four corners of an imaginary second quadrangle on the top side of the non-magnetic block; and
   the magnets of the second and the third coupling pairs having their respective N-poles pointing upwards are positioned at two adjacent corners and the other two magnets having their respective S-poles pointing upwards are positioned at the other two corners of the second quadrangle.

14. The magnetic stirrer of claim 13, wherein the second quadrangle is a second rectangle.

15. The magnetic stirrer of claim 13, wherein the six magnets of the three coupling pairs are positioned on and equiangularly spaced around an imaginary circle on the top side of the non-magnetic block.

16. The magnetic stirrer of claim 15, wherein the axis of rotation of the magnetic coupling assembly passes through the center of the imaginary circle.

17. The magnetic stirrer of claim 15, wherein the non-magnetic block of the magnetic coupling assembly is of a circular disc shape.

18. A magnetic stirrer mixer, comprising:
a magnetic coupling assembly comprising:
a non-magnetic block; and
a first coupling pair of magnets and a second coupling pair of magnets mounted in a top side of the non-magnetic block, wherein
the two magnets of each of the two coupling pairs are oriented such that one has its north pole (N-pole) pointing upwards and the other has its south pole (S-pole) pointing upwards;
the four magnets of the two coupling pairs of magnets are respectively positioned at four corners of an imaginary first quadrangle on the top side of the non-magnetic block; and
the two magnets having their respective N-poles pointing upwards are positioned at two adjacent corners of the first quadrangle; and
a drive mechanism connected to the non-magnetic block for rotating the non-magnetic block and therefore the magnetic coupling assembly about an axis of rotation;
a vessel mounted above the magnetic coupling assembly for containing a liquid to be stirred; and
a stir bar inside the vessel to be magnetically coupled and driven by the magnetic coupling assembly to stir the liquid in the vessel.

19. The magnetic stirrer mixer of claim 18, wherein the magnetic coupling assembly further comprises a third coupling pair of magnets mounted in the top side of the non-magnetic block, wherein
the two magnets of the third coupling pair are oriented such that one has its north pole (N-pole) pointing upwards and the other has its south pole (S-pole) pointing upwards;
the two magnets of the third coupling pair and the two magnets of the second coupling pair are respectively positioned at four corners of an imaginary second quadrangle on the top side of the non-magnetic block; and
the magnets of the second and the third coupling pairs having their respective N-poles pointing upwards are positioned at two adjacent corners and the other two magnets having their respective S-poles pointing upwards are positioned at the other two corners of the second quadrangle.

20. The magnetic stirrer mixer of claim 19, wherein there are two stir bars in the vessel to be magnetically coupled and driven by the magnetic coupling assembly.

21. The magnetic stirrer mixer of claim 20, wherein the two stir bars are mounted in tandem with a non-magnetic fixture in the vessel.

22. The magnetic stirrer mixer of claim 21, wherein an impeller is attached to the non-magnetic fixture.

* * * * *